United States Patent
Kishita et al.

(10) Patent No.: US 9,020,616 B2
(45) Date of Patent: Apr. 28, 2015

(54) CONTROL APPARATUS AND CONTROL METHOD OF PERFORMING OPERATION CONTROL OF ACTUATORS

(75) Inventors: Yuri Kishita, Yokkaichi (JP); Kazuhito Fujita, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 36 days.

(21) Appl. No.: 12/719,273

(22) Filed: Mar. 8, 2010

(65) Prior Publication Data

US 2010/0249953 A1    Sep. 30, 2010

(30) Foreign Application Priority Data

Mar. 24, 2009 (JP) ................................ 2009-072623

(51) Int. Cl.
| | |
|---|---|
| G05B 11/01 | (2006.01) |
| G06F 19/00 | (2011.01) |
| G06F 3/00 | (2006.01) |
| G06F 15/00 | (2006.01) |
| G06F 9/00 | (2006.01) |
| B60L 3/00 | (2006.01) |
| B60Q 11/00 | (2006.01) |
| G05B 19/042 | (2006.01) |

(52) U.S. Cl.
CPC .. *G05B 19/0426* (2013.01); *G05B 2219/23236* (2013.01)

(58) Field of Classification Search
CPC .. B60R 16/0232; G05B 15/02; G01R 31/007; B60W 50/0098
USPC ............... 700/12, 23, 25; 710/1–7; 386/230; 701/1, 29.1, 33.4, 34.4; 719/328, 329
See application file for complete search history.

(56) References Cited

U.S. PATENT DOCUMENTS

| | | | | |
|---|---|---|---|---|
| 5,592,614 | A | * | 1/1997 | Peters ............................ 714/26 |
| 5,872,985 | A | * | 2/1999 | Kimura ............................ 710/1 |
| 6,075,438 | A | * | 6/2000 | Abe et al. ................. 340/286.01 |
| 6,164,015 | A | * | 12/2000 | Kawanobe et al. ............. 49/360 |
| 6,729,071 | B1 | * | 5/2004 | Kawanobe et al. ............. 49/360 |

(Continued)

FOREIGN PATENT DOCUMENTS

| | | |
|---|---|---|
| DE | 601 16 788 T2 | 8/2006 |
| DE | 697 37 308 T2 | 9/2007 |

(Continued)

OTHER PUBLICATIONS

Office Action issued in German Application No. 102010003122.4 dated Jul. 19, 2012 (with translation).

(Continued)

*Primary Examiner* — Crystal J Barnes-Bullock
(74) *Attorney, Agent, or Firm* — Oliff PLC

(57) ABSTRACT

In a microcomputer, by virtue of the function of one input signal judgment module in the application layer, with respect to whether the situation is such that operation is to be requested to a controlled object from each of a plurality of applications, judgment processing onto input signals representing status information of controlled objects or detection information from sensors or the like is made common. The object-oriented architecture is introduced into an embedded computer program so that the memory is saved and the apparatus is simplified.

5 Claims, 12 Drawing Sheets

(56) References Cited

U.S. PATENT DOCUMENTS

| | | | | |
|---|---|---|---|---|
| 6,804,414 B1* | 10/2004 | Sakai et al. | | 382/289 |
| 6,854,646 B2* | 2/2005 | Ieshima et al. | | 235/380 |
| 7,062,157 B2* | 6/2006 | Iwai et al. | | 386/230 |
| 7,183,733 B2* | 2/2007 | Suzuki et al. | | 318/282 |
| 7,321,814 B2* | 1/2008 | Kanda et al. | | 701/29.6 |
| 7,761,437 B2* | 7/2010 | Tsuzuki et al. | | 707/705 |
| 7,863,934 B2* | 1/2011 | Lin | | 326/82 |
| 7,865,529 B2* | 1/2011 | Kobayashi | | 707/796 |
| 7,895,025 B2* | 2/2011 | Boutin | | 703/13 |
| 8,077,921 B2* | 12/2011 | Kawasaki | | 382/104 |
| 8,108,083 B2* | 1/2012 | Kameyama | | 701/1 |
| 8,184,159 B2* | 5/2012 | Luo | | 348/148 |
| 8,214,508 B2* | 7/2012 | Masuoka | | 709/228 |
| 8,242,886 B2* | 8/2012 | Murakami | | 340/5.72 |
| 8,244,480 B2* | 8/2012 | Doi | | 702/20 |
| 8,466,961 B2* | 6/2013 | Sekine et al. | | 348/143 |
| 8,643,467 B2* | 2/2014 | Chutorash et al. | | 340/5.71 |
| 2007/0233892 A1* | 10/2007 | Ueno | | 709/231 |
| 2009/0129759 A1* | 5/2009 | Mizuguchi et al. | | 386/131 |
| 2010/0141578 A1* | 6/2010 | Horiuchi et al. | | 345/158 |
| 2010/0208072 A1* | 8/2010 | Murano et al. | | 348/148 |
| 2010/0287563 A1* | 11/2010 | Kishita | | 719/313 |

FOREIGN PATENT DOCUMENTS

| | | |
|---|---|---|
| JP | A-62-154104 | 7/1987 |
| JP | A-2007-300476 | 11/2007 |
| JP | A 2008-077220 | 4/2008 |
| WO | WO 98/26958 A1 | 6/1998 |
| WO | WO 02/31608 A2 | 4/2002 |

OTHER PUBLICATIONS

Feb. 19, 2013 Office Action issued in Japanese Patent Application No. 2009-072623 (with translation).

* cited by examiner

FIG. 5

| IG | | |
|---|---|---|
| ON | EDGE | OFF → ON |
| | LEVEL | ON → ON |
| OFF | EDGE | ON → OFF |
| | LEVEL | OFF → OFF |

| COURTESY | | |
|---|---|---|
| ON | EDGE | OFF → ON |
| | LEVEL | ON → ON |
| OFF | EDGE | ON → OFF |
| | LEVEL | OFF → OFF |

| DOOR LOCK | | |
|---|---|---|
| LOCK | EDGE | UNLOCK → LOCK |
| | LEVEL | LOCK → LOCK |
| UNLOCK | EDGE | LOCK → UNLOCK |
| | LEVEL | UNLOCK → UNLOCK |

FIG. 6

FUNCTION ENTRY CONTROL
(UNLOCKING DOOR AND TURNING LAMP ON)

IG TABLE

| OFF → ON | NULL | NON-SATISFACTION |
|---|---|---|
| ON → ON | NULL | NON-SATISFACTION |
| ON → OFF | &COURTESY TABLE | SATISFACTION |
| OFF → OFF | &COURTESY TABLE | SATISFACTION |

COURTESY TABLE

| OFF → ON | NULL | NON-SATISFACTION |
|---|---|---|
| ON → ON | NULL | NON-SATISFACTION |
| ON → OFF | &DOOR LOCK TABLE | SATISFACTION |
| OFF → OFF | &DOOR LOCK TABLE | SATISFACTION |

DOOR LOCK TABLE

| UNLOCK → LOCK | NULL | NON-SATISFACTION |
|---|---|---|
| LOCK → LOCK | NULL | NON-SATISFACTION |
| LOCK → UNLOCK | NULL | SATISFACTION |
| UNLOCK → UNLOCK | NULL | NON-SATISFACTION |

F I G. 1 0
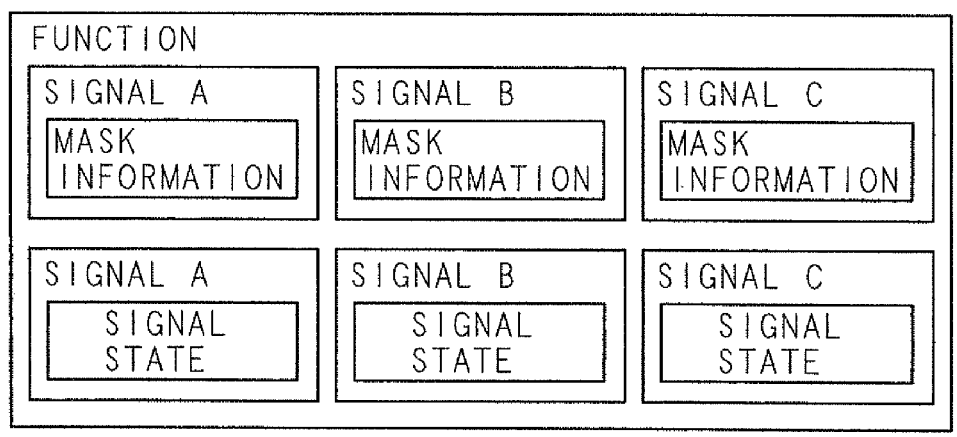

CONTROL APPARATUS AND CONTROL METHOD OF PERFORMING OPERATION CONTROL OF ACTUATORS

CROSS-REFERENCE TO RELATED APPLICATIONS

This Nonprovisional application claims priority under 35 U.S.C. §119(a) on Patent Application No. 2009-72623 filed in Japan on Mar. 24, 2009, the entire contents of which are hereby incorporated by reference

BACKGROUND

1. Technical Field

The present invention relates to a control apparatus performing operation control of various kinds of actuators on the basis of a computer program. In particular, the present invention relates to a control apparatus, a control method, and a computer program in which the computer program has a configuration that permits memory saving and realizes apparatus simplification and in which addition and removal of various kinds of functions for individual actuators are treated flexibly so that development efficiency is improved.

2. Description of Related Art

In a microcomputer-based control apparatus performing control on the basis of computer programs stored in a ROM built in the microcomputer, such computer programs are described in an embedded language. Such computer programs described in an embedded language is configured for that resources such as a memory are saved for the purpose of simplification of the apparatus and that minimum necessary processing alone is installed for each controlled object and for each function.

FIG. 1 is a diagram illustrating a schematic configuration of a computer program in a related art microcomputer. The configuration of the computer program illustrated in FIG. 1 is, in particular, an example of a computer program executed by a microcomputer in a control apparatus controlling the operation of a controlled object (actuator X). In FIG. 1, functions implemented by the computer program are illustrated in the form of blocks. When the computer program in the example in FIG. 1 implements the function targeting the actuator X serving as a controlled object, as illustrated in FIG. 1, the computer program is implemented in correspondence to each of functions (a) and (b) to be realized by the application programs, for each of functions such as: judgment processing for signals A, B, and C respectively inputted from sensors or actuators; judgment processing for judging operation to be requested for the actuator X in order to realize a function on the basis of the judgment result of the input signals; arbitration of signal outputs for operation requests to the actuator; and signal output to the actuator for each operation.

Further, on the installation of the computer program, a corresponding program code (execution file) is generated separately for each function. Then, these program codes are stored in advance in the memory and read by the CPU. Thus, a memory area is occupied separately by each block illustrated in FIG. 1. That is, for example, as for the judgment processing onto the input signals, a program code is provided separately for each of the functions (a) and (b) and for each of the signals A, B, and C.

The example illustrated in FIG. 1 is a configuration that the function is different between (a) and (b) but a program code corresponding to the input signal judgment module is provided separately even for the same input signal A. When a situation that the functions (a) and (b) are simultaneously executed in parallel is avoided, such a configuration that a program code is provided separately for each function causes inefficient memory usage.

Further, in the judgment processing onto the input signals, in general, on the basis of each signal level of Hi or Low, it is judged whether the switch is ON or OFF, whether the state is locked or unlocked, or the like. That is, although the contents of the input signal is different from each other, the detailed contents of the processing of judgment processing is common, i.e., judgment whether the signal level is Hi or Low. The configuration that a program code for this judgment processing is provided separately for each of various kinds of input signals causes inefficient memory usage.

Further, in this case, judgment on the input signals A, B, and C is not simultaneously performed, that is, judgment on the input signals A, B, and C is performed sequentially. Furthermore, operation in accordance with the judgment result is also performed sequentially, and hence the memory areas storing the program codes for the judgment processing onto the input signals are not simultaneously accessed. In spite of such a situation, program codes each corresponding to each operation to be executed by the microcomputer occupy the memory area permanently. This causes an inefficient memory utilization rate.

In contrast, with progress in diversification and complexity of functions required in control apparatuses, even a control apparatus is proposed in which programs described in an object-oriented programming language are read and executed by a microcomputer (see, for example, Japanese Patent Application Laid-Open No. 2008-77220). In this configuration, a memory area is allocated at each time of execution of processing, and then on completion of the processing, the memory area is released so as to be available for another processing. Thus, the memory usage efficiency is improved. Nevertheless, such a configuration requires basic functions (a library) that allow the microcomputer to perform processing like dynamic memory allocation during the program execution. As such, in a configuration designed in an object-oriented manner, in addition to a situation that library program codes for implementing the basic functions use a memory area, various kinds of processing is necessary like dynamic memory allocation and dynamic library linkage. Thus, various kinds of functions are achieved by a configuration of object-oriented computer programs only when the memory has a sufficient storage capacity.

SUMMARY

Nevertheless, in microcomputer-based control apparatuses performing actuator control, the reason why computer programs described in an embedded language are adopted is limitation in the memory capacity. Thus, except for particular control apparatuses having a sufficient storage capacity in the memory, an object-oriented software architecture is not suitable. On the other hand, in a related art configuration of computer programs in which even when processing is shareable, each program code occupies a memory area separately for each of various kinds of input signals, for each of actuators serving as controlled objects, and for each of various kinds of functions, memory usage is inefficient as described above. That is, a configuration is preferred that similar processing is commonized such as to be shared and reused so that solely a single program code corresponding to the shared processing occupies the memory area.

The present invention has been devised in view of such situations. An object of the present invention is to provide a control apparatus and a control method in which an object-oriented architecture is introduced into an embedded computer program so that the memory is saved and the apparatus is simplified and hence its development efficiency is improved.

The control apparatus according to the present invention is a control apparatus provided with a microcomputer receiving input signals representing status information of a plurality of controlled objects or detection information from a plurality of sensors, wherein the microcomputer executes a plurality of application programs such as to, in accordance with a situation determined on the basis of the input signals, outputs an operation request to any one of the plurality of controlled objects so as to control operation of the controlled objects, the control apparatus comprising: judging means for, when input signals and judgment conditions on the input signals are provided, judging satisfaction or non-satisfaction of the conditions; extracting means for extracting one or a plurality of input signals from a plurality of input signals, for each function of the application programs; and determining means for providing to the judging means one or a plurality input signals extracted for each function and judgment conditions corresponding to the input signals and then, in accordance with each judgment result from the judging means, determining whether the situation is such that an operation request is to be outputted.

The control method according to the present invention is a method of, by using a microcomputer receiving input signals representing status information of a plurality of controlled objects or detection information from a plurality of sensors, causing the microcomputer to execute a plurality of application programs, wherein on the basis of a computer program different from the plurality of application programs, the microcomputer serves as judging means, when input signals and judgment conditions on the input signals are provided, judging satisfaction or non-satisfaction of the conditions, wherein in accordance with a situation determined on the basis of the input signals, an operation request is outputted to any one of the plurality of controlled objects so that operation of the controlled objects is controlled, and wherein on the basis of the processing based on the application programs, for each function, the microcomputer extracts one or a plurality of input signals related to the function, then sequentially provides to the judging means the extracted one or plurality of input signals and judgment conditions corresponding to the input signals, then in accordance with each judgment result from the judging means, determines whether the situation is such that an operation request is to be outputted, and then when the situation is determined as being such that an operation request is to be outputted, and outputs an operation request.

The computer program according to the present invention is a computer program to cause a computer connected to a plurality of controlled objects or a plurality of sensors and receiving input signals representing status information of the controlled objects or detection information from the sensors to serve as judging means for, at the time of performing processing in which on the basis of a plurality of application programs, in accordance with a situation determined on the basis of the input signals, an operation request is outputted to any one of the plurality of controlled objects so that the controlled objects are controlled, when input signals and judgment conditions on the input signals are provided, judging satisfaction or non-satisfaction of the conditions, wherein the computer is caused to serve as: means for providing to the judging means one or a plurality input information pieces extracted for each function of the application programs and judgment conditions corresponding to the input information; and means for, on the basis of each judgment result obtained from the one or plurality input information pieces by the judging means, determining whether the situation is such that an operation request is to be outputted.

In the processing of application programs implementing a plurality of functions on the basis of the input signals representing the information, on the control state of the controlled objects or the information detected by the individual sensors, when the microcomputer determines whether the situation is such that an operation request is to be outputted corresponding to the function, judgment processing onto the input signals is executed by the judging means. Signals used for determining whether controlled objects are to be operated in correspondence to the plurality of functions are extracted. Then, the judging means judges whether the judgment conditions are satisfied for the extracted input signals. On the basis of each judgment result obtained by the judging means, it is determined whether the situation is such that an operation request is to be outputted.

At that time, processing based on the plurality of application programs is executed, but the judging means judging the satisfaction or non-satisfaction of the judgment conditions by the input signals is shared by the plurality of application programs. Thus, the judgment processing is shared that has been, in the related art, executed separately for the input signals corresponding to each application program despite that the contents of processing is duplicated.

The control apparatus according to the present invention is a control apparatus comprising means for storing, for each function, input signals and judgment conditions to be provided to the judging means, and branch condition information indicating input signals and judgment conditions to be provided next in accordance with judgment results obtained when the input signals and the judgment conditions are provided to the judging means, wherein on the basis of the branch condition information, the determining means selects and provides the next input signals and judgment conditions in accordance with each judgment result.

For each function, branch condition information is stored that is composed of: input signals serving as objects of determination whether the situation is such that control corresponding to the function is to be performed and judgment conditions on the individual input signals; and information indicating input signals to be provided next in accordance with the judgment result of the judgment conditions. Then, judgment is performed on the basis of the branch condition information. The judgment object is switched on the basis of the branch condition. Thus, even in a configuration that the judging means performs the same judgment processing, the same result is obtained as that of a configuration that judgment processing is performed separately for each signal.

The control apparatus according to the present invention is a control apparatus comprising a table describing judgment conditions for each input signal, wherein the branch condition information contains a reference address to judgment conditions for input signals to be provided next.

The judgment conditions for the individual input signals are in the form of a table. The branch condition information indicates the reference positions of the judgment conditions on the input signals corresponding to the result of each judgment condition. Even when signals serving as judgment objects are switched, the judging means performs, in the same manner, judgment processing of referring to the judgment conditions at the described reference positions and thereby determining whether the input signals satisfy the conditions. Thus, judgment on diverse input signals is achieved in accordance with branching corresponding to the judgment result.

By virtue of this, a single piece of common judging means achieve judgment on various kinds of input signals.

The control apparatus according to the present invention is a control apparatus wherein in a case that the last judgment result obtained when input signals and judgment conditions are provided sequentially to the judging means on the basis of the branch condition information is satisfaction, the determining means determines that the situation is such that an operation request is to be outputted.

Satisfaction or non-satisfaction indicated as the final judgment result obtained by the processing performed on the basis of the branch condition information by the judging means indicates the determination whether the situation is such that an operation request is to be outputted. The judging means performs the same processing of returning a judgment result for the plurality of input signals, so that a final determination result is obtained.

The control apparatus according to the present invention is a control apparatus comprising, for each function, a table describing input signals corresponding to each function and judgment conditions on the input signals, wherein the extracting means extracts input signals on the basis of the table.

Input signals to be adopted as judgment objects and judgment conditions on the individual input signals may be stored in a table for each function. When a function is specified, input signals to be judged are extracted. Then, regardless of the order of judgment of the input signals serving as judgment objects, when a judgment condition is not satisfied for any one of the extracted input signals, the judgment result is non-satisfaction.

As described above, in the present invention, even in a control apparatus performing control on the embedded computer programs, in the operation of implementing each function, judgment processing performed onto input signals in order to determine whether the situation is such that operating is to be performed is shared by the functions. That is, the function of a single piece of judging means is used for judgment processing onto various kinds of input signals.

By virtue of this configuration that a single program code to be used in common is stored in the memory and executed so that each function is implemented, the amount of occupied memory area is reduced in comparison with a configuration that a program code performing judgment processing onto each of various kinds of input signals is stored and executed separately for each of various kinds of input signals and for each function. This memory saving permits apparatus simplification. Further, it is sufficient that the function of the shared judging means is reused after the relation between the input signals itself and the judgment result is changed. Thus, even when judgment processing on new input signals is added, a new program corresponding to this processing need not be installed. That is, as long as a configuration that the relation between input signals and judgment conditions corresponding to the input signals is imparted is maintained, development of an application program is sufficient for the implementation. Thus, the development efficiency is improved.

The above and further objects and features of the invention will more fully be apparent from the following detailed description with accompanying drawings.

BRIEF DESCRIPTION OF THE SEVERAL VIEWS OF THE DRAWINGS

FIG. 5 is an explanation diagram illustrating an example of contents of decision tables stored in a ROM of a body ECU according to Embodiment 1;

FIG. 6 is an explanation diagram schematically illustrating an example of contents of link information according to Embodiment 1;

FIG. 10 is an explanation diagram illustrating a basic configuration of a decision table stored in a ROM according to Embodiment 2;

DETAILED DESCRIPTION

The present invention is described below in detail with reference to the drawings illustrating embodiments. Here, the following embodiments are described for examples of a is vehicle-mounted control system in which a control apparatus according to the present invention is applied to a vehicle-mounted body ECU controlling various kinds of controlled objects of body systems such as lamps, lights, doors, and wipers installed in a vehicle cabin.

Embodiment 1

Figure 2:
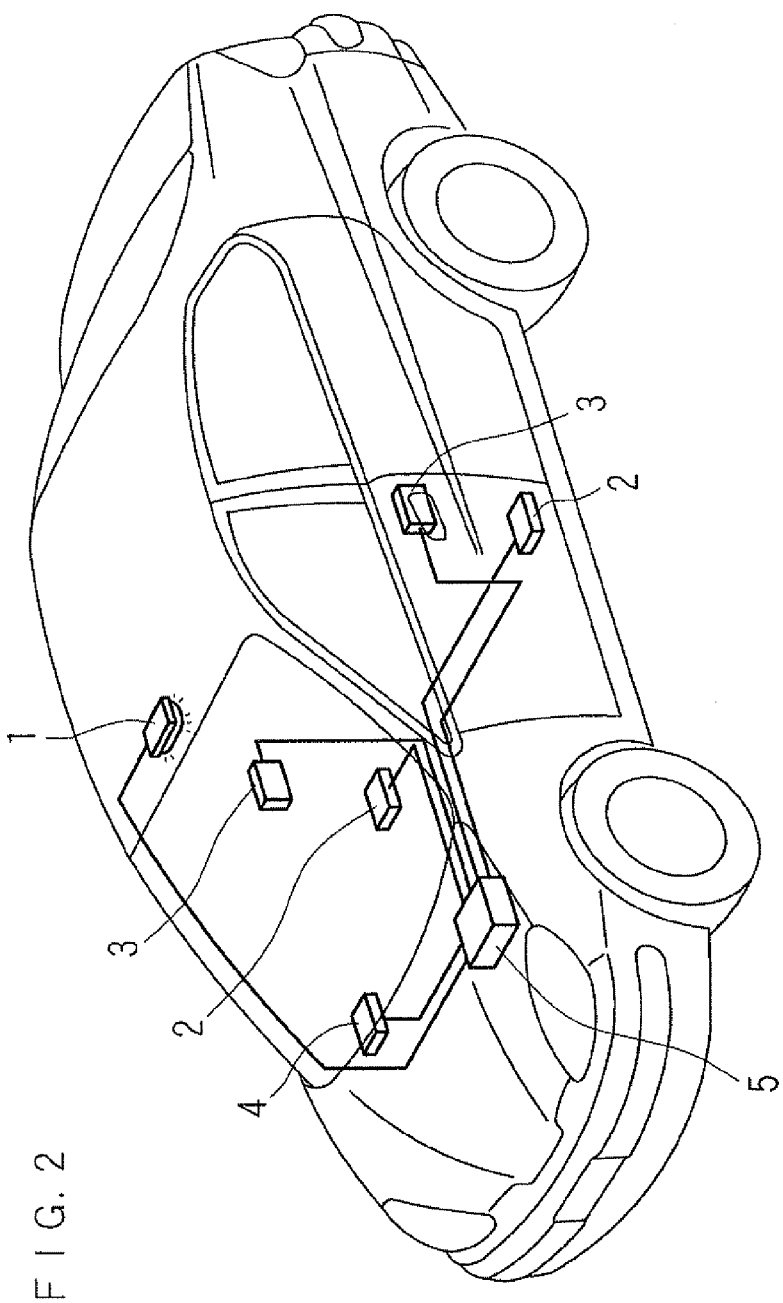
FIG. 2 is a configuration diagram illustrating a configuration of a vehicle-mounted control system according to Embodiment 1.

FIG. 2 is a configuration diagram illustrating a configuration of a vehicle-mounted control system according to Embodiment 1. The vehicle-mounted control system has: a room lamp 1 attached to the front part of the ceiling in the car cabin; courtesy sensors 2 and 2 installed in the door parts of the vehicle and detecting the opening or closing of the doors; door lock sensors 3 and 3 detecting the door lock states; an IG key sensor 4 detecting the insertion or removal of the ignition key (referred to as an IG key, hereinafter); and a body ECU 5 controlling these.

The room lamp 1 is connected to the body ECU 5. Then, its turn-ON or turn-OFF is controlled by the body ECU 5. Here, in either turn-ON or turn-OFF, dimming and brightening are allowed by PWM control.

The courtesy sensors 2 and 2 and the door lock sensors 3 and 3 are connected to the body ECU 5, and respectively output to the body ECU 5 signals notifying a door open/closed state and signals notifying a door locked/unlocked state.

The IG key sensor 4 is connected to the body ECU 5, and outputs to the body ECU 5 a signal representing the insertion or removal of the IG key and a key position detected by the IG key sensor 4.

The body ECU 5 receives signals outputted from the courtesy sensors 2 and 2, the door lock sensors 3 and 3, and the IG key sensor 4. Then, on the basis of these signal levels, for example, when the doors are closed, the IG key is not inserted, and the door lock is changed from a locked state to an unlocked state, this situation indicates that the door is unlocked by a user desiring to get in. Thus, entry control is performed in which a control signal for turning ON the room lamp 1 is outputted. Further, similarly, when the doors are closed, the IG key is not inserted, but the door lock is changed from an unlocked state to a locked state, this situation indicates that the door is locked by a user having got out. Thus, door lock and lamp dimming control is performed in which a control signal is outputted such that the room lamp 1 having been ON is to be dimmed gradually into an OFF state.

Here, in Embodiment 1, description of the body ECU 5 is given only for processing by functional components related to the turn-ON of the room lamp 1. However, obviously, in order to implement other functions, the body ECU 5 may control other actuators serving as other controlled objects (actuators) such as headlights, small lamps, front wipers, and a rear wiper.

The configuration of and the processing in the inside of the body ECU 5 are described below that are employed in order to implement such various kinds of functions in the body ECU 5. As described later, the body ECU 5 has a microcomputer 50, and executes processing on the basis of computer programs stored in a ROM (Read Only Memory) 52 built in the microcomputer 50 so as to implement various kinds of functions.

Figure 3:
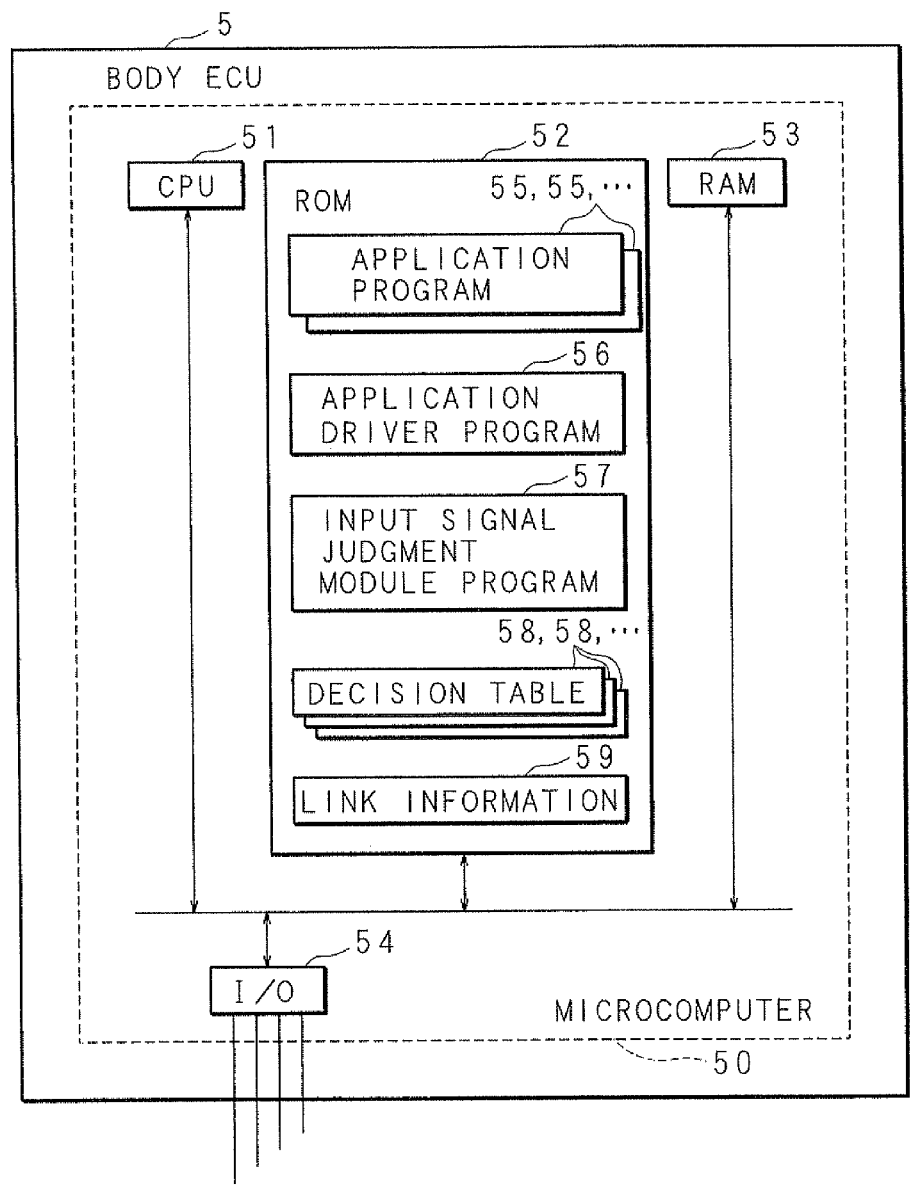
FIG. 3 is a block diagram illustrating an internal configuration of a body ECU employed in a vehicle-mounted control system according to Embodiment 1.

FIG. 3 is a block diagram illustrating an internal configuration of the body ECU 5 employed in the vehicle-mounted control system according to Embodiment 1. The body ECU 5 has a microcomputer 50 provided with a CPU 51, a ROM 52, a RAM (Random Access Memory) 53, and an I/O 54. In addition, when connection is constructed via a vehicle-mounted network to the sensors such as the courtesy sensors 2 and 2, the door lock sensors and 3, and the key sensor 4, a network controller and a transceiver serving as communicating means may be provided inside or outside the microcomputer 50.

The CPU 51 reads onto the RAM 53 a computer program stored in the ROM 52, and then executes the program so as to implement the functions of turn-ON, turn-OFF, and dimming of the room lamp 1 as described above.

The ROM 52 is constructed from a flash memory. The ROM 52 stores application programs 55, 55, . . . , an application driver program 56, and an input signal judgment module program 57 which are read and executed by the CPU 51 and used for implementing the functions concerning the body system. In addition, driver programs (not illustrated) are stored that are used for implementing in the physical layer the signal input and output to and from various kinds of actuators such as the room lamp 1. Further, the ROM 52 stores decision tables 58, 58, . . . , each for each actuator, referred by the CPU 51 for judging a state indicated by the input signals from the sensors. Furthermore, link information 59 indicating the link relation between the decision tables 58, 58, . . . is stored for each function.

Here, the ROM 52 is basically read-only (ROM) during the operation of the body ECU 5. However, when the computer programs to be executed by the CPU 51 need be updated or alternatively the decision tables 58, 58, . . . need be updated, rewrite is allowed.

The RAM 53 is constructed from a DRAM (Dynamic RAM), an SRAM (Static RAM), or the like. The RAM 53 stores computer programs read and loaded by the CPU 51, and temporarily stores various kinds of information generated in association with the processing.

The I/O 54 is an interface of the microcomputer 50 between the outside. The microcomputer 50 outputs a control signal to the room lamp 1 via the I/O 54.

Figure 4:
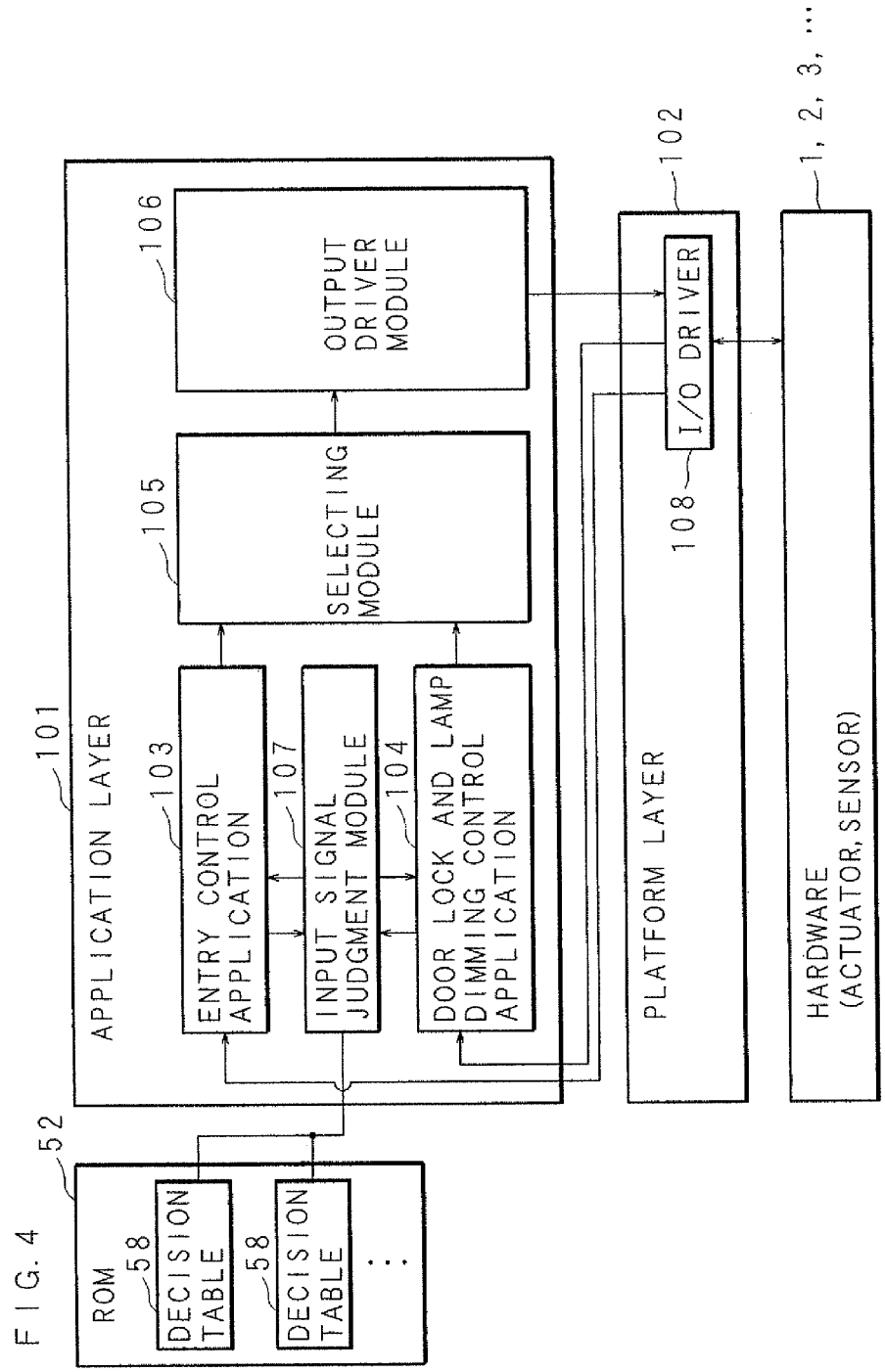
FIG. 4 is a functional block diagram conceptually illustrating a function implemented by a CPU of a microcomputer in a body ECU according to Embodiment 1.

Detailed functions of the microcomputer 50 which are implemented when the CPU 51 of the microcomputer 50 reads computer programs stored in the ROM 52 are described below. FIG. 4 is a functional block diagram conceptually illustrating the functions implemented by the CPU 51 of the microcomputer 50 in the body ECU 5 according to Embodiment 1.

The CPU 51 reads and executes the application programs 55, 55, . . . , the application driver program 56, the input signal judgment module program 57, other driver programs, and the like stored in the ROM 52, and thereby operates by virtue of a software structure divided into the hierarchy of an application layer 101 and a platform layer 102.

On the basis of an application program 55 for entry control among the application programs 55, 55, . . . , the CPU 51 serves as an entry control application 103. Similarly, on the basis of an application program 55 for door lock and lamp dimming control, the CPU 51 serves as a door lock and lamp dimming control application 104. The functions of the entry control application 103 and the door lock and lamp dimming control application 104 are located in the application layer 101 from the perspective of structure.

On the basis of the application, driver program 56, the CPU 51 implements the functions of a selecting module 105 and an output driver module 106. The functions of the selecting module 105 and the output driver module 106 are not those of so-called drivers treating signals in the physical layer in order to directly control the hardware group (the controlled object group such as the room lamp 1, the headlights, and the small lamps). That is, these modules serve as modules in which a common part like signal generation processing among processing of various kinds of applications such as the entry control application 103 and the door lock and lamp dimming control application 104 is commonized into one, and are located in the application layer 101.

On the basis of the input signal judgment module program 57, the CPU 51 implements the function of the input signal judgment module 107. The input signal judgment module 107 serves as a module in which the processing of judging the signal level of the input signal related to a function when an instruction of input signal judgment is received from an application is commonized. Each application reuses the function of the input signal judgment module 107 so as to determine whether the situation is such that operating is to be performed. That is, by using the input signal judgment module 107, both the entry control application 103 and the door lock and lamp dimming control application 104 determine whether the situation is such that the room lamp 1 is to be turned ON and whether the situation is such that dimming turn-OFF is to be performed, respectively. The input signal judgment module 107 is located in the application layer 101.

Then, on the basis of a driver program, the CPU 51 serves as an I/O driver 108. The I/O driver 108 implements the function of a so-called driver, and performs actual input and output of control signals in the physical layer to and from the I/O 54 in order to directly control the hardware group. The function of the I/O driver 108 is located in the platform layer 102 from the perspective of structure.

The function of the CPU 51 as the selecting module 105 is as follows. When the CPU 51 serves as the entry control application 103 or the door lock and lamp dimming control application 104 so as to issue an operation request such as a turn-ON request to hardware serving as a controlled object like the room lamp 1, the selecting module 105 receives the operation request, then identifies a controlled object and detailed operation to be performed by the controlled object, and then provides information indicating the identified controlled object and the contents of operation, to the output driver module 106.

The function of the CPU 51 as the output driver module 106 is as follows. On the basis of the information provided from the selecting module 105 and concerning the controlled object and the detailed operation to be performed by the controlled object, the output driver module 106 generates a control signal for implementing the operation, and then instructs the I/O driver 108 in the platform layer 102 to output the control signal to the hardware of controlled object.

The function of the CPU 51 as the input signal judgment module 107 is as follows. For the input signals extracted for each function of each application, the input signal judgment module 107 judges satisfaction or non-satisfaction of judgment conditions used for determining whether the situation is such that the function is to be implemented, and then returns the judgment result to each application. The input signal judgment module 107 according to Embodiment 1 has a reentrance structure permitting usage for each input signal.

Figure 1:
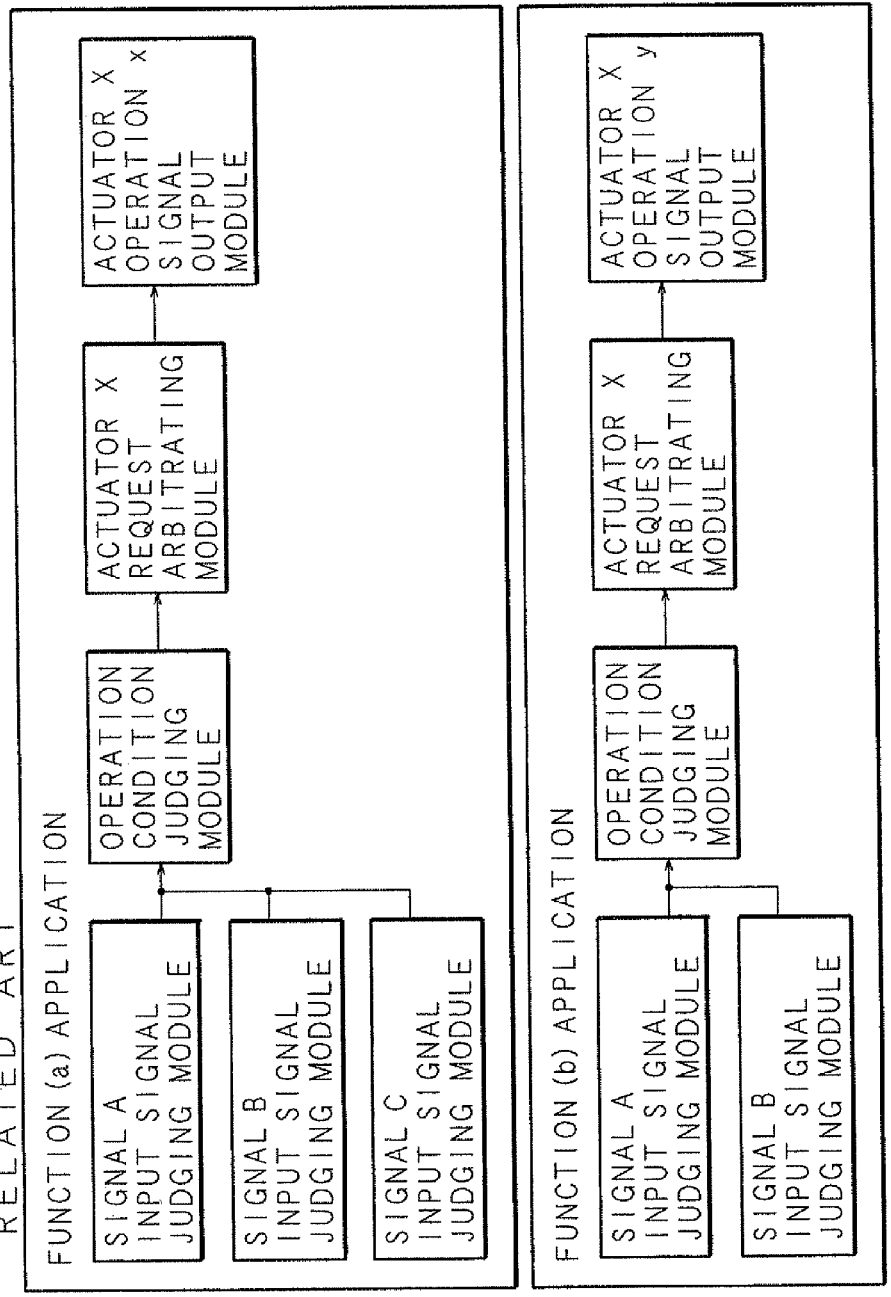
FIG. 1 is a diagram illustrating a schematic configuration of a computer program in a related art microcomputer.

As such, first, in the body ECU 5 according to the present Embodiment 1, a configuration is adopted that operation requests from individual applications are collectively received by the selecting module 105 and that the function of the output driver module 106 for generating control signals is shared. That is, a configuration that a control signal is generated separately for each of the applications such as the entry control application 103 and the door lock and lamp dimming control application 104 and for each actuator of controlled object and then outputted to the I/O driver 108 (see FIG. 1) is not adopted. In any application such as the entry control application 103 and the door lock and lamp dimming control application 104, when the control is implemented by ON/OFF switching, the processing of generating a control signal corresponding to the operation request is of common processing although the detailed contents of the operation are different from each other. Thus, sharing of such processing is allowed. Further, in the body ECU 5, control of the hardware is performed not simultaneously for individual controlled objects. Further, the functions of the individual applications are executed sequentially. Thus, a configuration that permits simultaneous generation of control signals is not necessary, and hence sharing may be adopted. Thus, when the processing is commonized into one such as to be shared and reused from each function, the amount of occupied memory area in the ROM 52 and the RAM 53 is reduced.

Further, in the body ECU 5 according to the present Embodiment 1, judgment on the input signals is also shared into the input signal judgment module 107. That is, a configuration that each application such as the entry control application 103 and the door lock and lamp dimming control application 104 has a module performing input signal judgment processing for each input signal is not adopted. In any application such as the entry control application 103 and the door lock and lamp dimming control application 104, as well as in any input signal, judgment whether the signal level is Hi or Low is performed. Although a different input signal is adopted as the object of judgment, judgment processing itself is common, and hence sharing is allowed. Further, in the body ECU 5, control of the hardware is performed not simultaneously for individual controlled objects. Further, the functions of the individual applications are executed sequentially. Thus, a configuration that permits simultaneous judgment of input signals is not necessary as a separate function of each application. Thus, when input signal judgment processing is commonized into one such as to be shared and reused from each function, the amount of occupied memory area in the ROM 52 and the RAM 53 is reduced further.

Specifically, when each function is implemented by the CPU 51, an execution program file (program code) corresponding to each function illustrated as each block in FIG. 4 is necessary. First, the functions of determination of a controlled object and generation processing for a control signal are shared respectively into the selecting module 105 and the output driver module 106, such as to be used from various kinds of functions. This reduces the necessary storage capacity in the ROM 52 and the RAM 53 in comparison with a configuration that a plurality of application driver programs respectively corresponding to the plurality of application programs 55, 55, . . . are executed. This is because the necessity that a program code corresponding to the output driver module 106 is prepared separately for each of the application programs 55, 55, . . . is avoided. Similarly, when the input signal judgment processing is shared into the input signal judgment module 107 such as to be used from the function of each application, the program code of the input signal judgment processing is omitted in each application. Thus, the necessary storage capacity in the ROM 52 and the RAM 53 is reduced further. Further, the processing of judging an input signal and the processing of generating a control signal need not be installed separately for each function to be implemented. That is, the functions of the input signal judgment module 107, the selecting module 105, and the output driver module 106 may be reused. Thus, the development of the function is completed when only the application programs 55, 55, . . . generating an operation request are developed. This improves the development efficiency.

The processing that the entry control application 103 and the door lock and lamp dimming control application 104 obtain a judgment result by using the input signal judgment module 107 is described below in detail.

The ROM 52 stores the decision tables 58, 58, . . . corresponding to the signal level for each actuator. The decision tables 58, 58, . . . describe judgment conditions and judgment methods for the signals of the sensors or the like for each output source. FIG. 5 is an explanation diagram illustrating an example of contents of decision tables 58, 58, . . . stored in the ROM 52 of the body ECU 5 according to Embodiment 1. In the decision tables 58, 58, . . . , judgment methods and judgment conditions are stored for each type of the input signal.

FIG. 5 illustrates an example of the decision tables 58, 58, and 58 of the input signals from the IG key sensor 4, the courtesy sensors 2 and 2, and the door lock sensors 3 and 3. The input signal from the IG key sensor 4 is sensor information indicating the insertion or removal of the IG key and the detected key position. The input signal judgment module 107 performs level judgment or edge judgment on the provided input signal. For the input signal, it is judged whether the signal has varied from OFF to ON by edge judgment, the signal is ON by level judgment, the signal has varied from ON to OFF by edge judgment, or the signal is OFF by level judgment. At that time, the value ON corresponds to a key position IG1.

The input signals from the courtesy sensors 2 and 2 indicate sensor information obtained by the detection of open or closed states of the doors. Also for the input signals from the courtesy sensors 2 and 2, whether ON or OFF is judged by any one of the methods of level judgment and edge judgment for each provided input signal. The value ON corresponds to an open state, while the value OFF corresponds to a closed state.

The input signals from the door lock sensors 3 and 3 indicate sensor information obtained by detection of locked or unlocked states of the doors. Also for the input signals from the door lock sensors 3 and 3, whether LOCK (ON) or UNLOCK (OFF) is judged by any one of the methods of level judgment and edge judgment for each provided input signal.

When an input signal is provided from each application, the input signal judgment module 107 refers to the decision tables 58, 58, . . . illustrated in FIG. 5, and on the basis of the signal level, judges which judgment condition is satisfied. For example, for the input signals from the door lock sensors 3 and 3, the input signal judgment module 107 judges which is satisfied among the judgment condition that the signal has varied from UNLOCK to LOCK which has been obtained as a result of edge judgment, the judgment condition that the signal is LOCK which has been obtained as a result of level judgment, the judgment condition that the signal has varied from LOCK to UNLOCK which has been obtained as a result of edge judgment, and the judgment condition that the signal is UNLOCK which has been obtained as a result of level judgment.

On the basis of the judgment result, the input signal judgment module 107 further performs judgment concerning the next input signal. With reference to the link information 59 provided from each application, the input signal judgment module 107 determines which input signals are to be provided next in accordance with the judgment result. The link information 59 is information indicating, for each function and each actuator, which input signals and which of the decision tables 58, 58, . . . for the input signals are to be used in the next judgment in accordance with the branching of the judgment result on the basis of each of the decision tables 58, 58, . . . .

FIG. 6 is an explanation diagram schematically illustrating an example of the contents of the link information 59 according to Embodiment 1. The link information 59 illustrated in FIG. 6 corresponds to the entry control application 103 in which when a user unlocks the door from the outside of the vehicle in order to get into the vehicle, the room lamp 1 is turned ON.

The link information 59 contains input signals to be extracted for the application program 55 or for each of its functions. The link information 59 illustrated in the example in FIG. 6 indicates that the input signals corresponding to the entry control application 103 are the input signal from the IG key sensor 4, the input signals from the courtesy sensors 2 and 2, and the input signals from the door lock sensors 3 and 3.

Then, the link information 59 contains information on the input signals serving as the next judgment objects determined in accordance with the judgment result. The example in FIG. 6 illustrates the link relation between the decision table 58 for each input signal and the inside-the-ROM 52 address of the decision table 58 to be used next in accordance with the judgment result. That is, the address of a decision table 58 for the input signals to be adopted as next judgment objects determined in accordance with the judgment result obtained for the input signals on the basis of the decision table 58 is described. The value "NULL" in FIG. 6 indicates the "absence" of a decision table 58 for the input signals to be adopted as the next judgment objects. In the case of "absence" of a corresponding decision table 58, the input signal judgment module 107 terminates the judgment processing onto the input signals. Specifically, the example in FIG. 6 indicates that in the entry control application 103, the input signal to be judged first by the input signal judgment module 107 is the input signal from the IG key sensor 4. Then, on the basis of the decision table 58 for the input signal from the IG key sensor 4, when it is judged that that the input signal is ON, the judgment result is "non-satisfaction" regardless of a situation that the signal has varied from OFF to ON or that the signal remains ON. In this case, further judgment is unnecessary. Thus, the address of the decision table 58 for the input signals to be adopted as the next judgment objects is expressed as "NULL".

As such, according to a configuration that the link information 59 indicating, for each function, the input signals serving as judgment objects and the sequence of the input signals to be adopted as the next judgment objects determined in accordance with the judgment result is stored in the ROM 52, even when a single piece of the input signal judgment module 107 performs the processing, judgment processing onto various kinds of input signals is achieved in accordance with the contents of the link information 59.

As illustrated in FIG. 6, the link information 59 according to Embodiment 1 is expressed as the link relation between the addresses of the decision tables 58, 58, . . . for the input signals. However, the contents of the link information 59 is not limited to this, and it is sufficient that the information indicates which input signals are to be adopted in the next judgment in accordance with the judgment result.

Here, obviously, in addition to the information concerning the room lamp 1 of the entry control application 103, the link information 59 contains the information corresponding to other application programs 55, 55, . . . and other actuators.

The processing that with reference to the decision tables 58, 58, . . . and the link information 59 as described above, on the basis of the judgment result for each input signal, the input signal judgment module 107 determines whether the situation is such that the function is to be implemented, that is, whether the condition indicating that operation is to be performed is satisfied is described below with reference to a flow chart.

Figure 7:
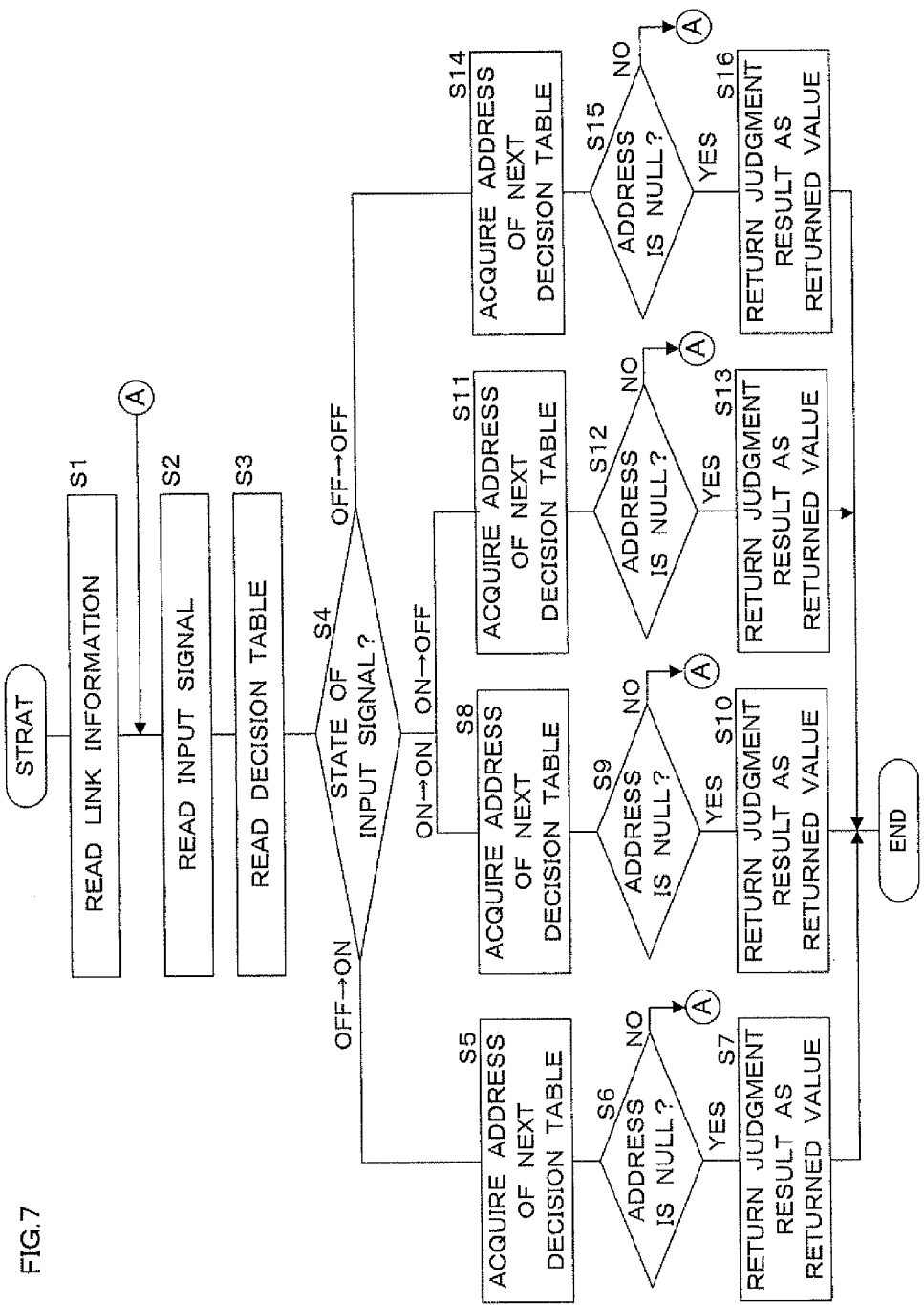
FIG. 7 is a flow chart illustrating an example of a processing procedure executed by an input signal judgment module according to Embodiment 1.

FIG. 7 is a flow chart illustrating an example of the processing procedure executed by the input signal judgment module 107 according to Embodiment 1. The following processing is performed in order to determine whether the situation is such that the entry control application 103 is to perform the own operation of entry control. The entry control application 103 provides to the input signal judgment module 107 the information indicating the link information 59 concerning the own operation situation judgment.

On the basis of the provided information, the input signal judgment module 107 identifies and reads the link information 59 from the ROM 52 (step S1), and then on the basis of the link information 59, extracts and reads the input signals necessary for judgment (step S2).

Then, the input signal judgment module 107 reads the decision tables 58, 58, . . . for the extracted input signals (step S3). On the basis of the link information 59, for the input signal to be adopted as the first judgment object among the extracted input signals, the input signal judgment module 107 determines which judgment condition in the decision table 58 is satisfied by the state of the signal level of the input signal (step S4).

When at step S4, the judgment condition that the input signal has varied from "OFF" to "ON" has been determined as being satisfied (54: OFF→ON), the input signal judgment module 107 acquires from the link information 59 the address of the next decision table 58 satisfying the condition (step S5). Then, the input signal judgment module 107 determines whether the acquired address is "NULL" (step S6).

When at step S6, the acquired address is determined as not being "NULL" (56: NO), the input signal judgment module 107 returns the procedure to step S2 so as to perform judgment on the basis of the next input signal and its decision table 58.

When at step S6, the acquired address is determined as being "NULL" (S6:YES), no input signal is to be judged next. Thus, from the link information 59, the input signal judgment module 107 reads the judgment result of satisfaction or non-satisfaction corresponding to the determination result obtained at step S4, then adopts the result as a returned value, then returns the value to the application having called the input signal judgment module 107 (step S7), and then terminates the processing.

When at step S4, it is determined that another judgment condition that the input signal was "ON" and still remains "ON" (S4: ON→ON), or when it is determined that the judgment condition that the input signal has varied from "ON" to "OFF" (S4: ON→OFF), or when it is determined that the judgment condition that the input signal was "OFF" and still remains "OFF" (S4: OFF→OFF), the input signal judgment module 107 acquires the address of the next decision table 58 (S8, S11, S14), and then determines whether the address is "NULL" (S9, S12, S15). Then, when the address is not "NULL" (S9, S12, S15: NO), the input signal judgment module 107 returns the procedure to step S2. When the address is "NULL" (S9, S12, S15: YES), the input signal judgment module 107 returns the judgment result corresponding to the determination result obtained at step S4, as a returned value to the application (S10, S13, S16), and then terminates the processing.

As illustrated in the flow chart of FIG. 7, by using the same program code, the input signal judgment module 107 repeatedly performs judgment on the state of each input signal on the basis of the provided input signal and the decision table 58 corresponding to the input signal (S4 to S15). Thus, processing on each input signal need not be installed as a separate program code. This is an effective point of this module.

Figure 8:
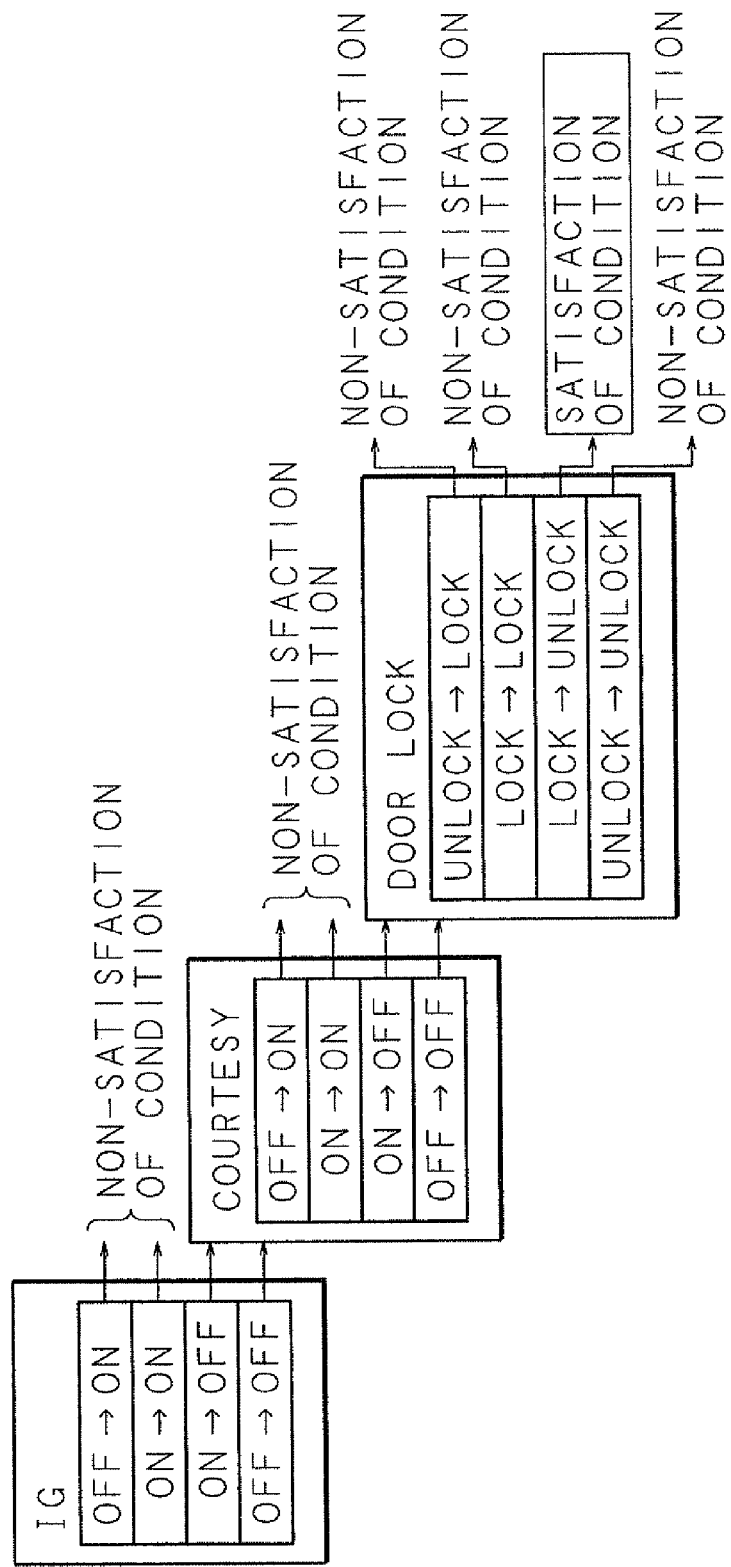
FIG. 8 is an explanation diagram conceptually illustrating a procedure of judgment processing performed by an input signal judgment module according to Embodiment 1.

FIG. 8 is an explanation diagram conceptually illustrating a procedure of judgment processing performed by the input signal judgment module 107 according to Embodiment 1. FIG. 8 illustrates the decision table 58 which is read on the basis of the link information 59 illustrated in FIG. 6 when the judgment processing is requested from the entry control application 103 and then the input signal judgment module 107 performs the processing as illustrated in FIG. 7.

As illustrated in FIG. 8, when judgment processing is requested from the entry control application 103, the input signal judgment module 107 first reads the link information 59 concerning the entry control (S1). The input signal judgment module 107 first reads the input signal from the IG key sensor 4 (S2), and then performs judgment on the input signal. The input signal judgment module 107 reads the decision table 58 corresponding to the input signal from the IG key sensor 4 (S3), and then determines which condition among those contained in the decision table 58 is satisfied (S4).

When the input signal from the IG key sensor 4 is "ON", regardless of the situation that the signal was "ON" and still remains "ON" or that the signal has varied from "OFF", the address of the next decision table 58 is still "NULL". Thus, the input signal judgment module 107 returns as a returned value the "non-satisfaction of condition" which is the judgment result corresponding to the situation that the input signal from the IG key sensor 4 is "ON" (S10).

In the lighting control for the room lamp 1 at the time of entry control, the processing is performed when a user unlocks the door from the outside of the vehicle in order to get into the vehicle. This is because when the key position is at IG1, this situation is that the user has already unlocked and opened the door and then started the engine and hence that the entry control is not to be performed.

When the judgment result of "non-satisfaction of condition" is returned from the input signal judgment module 107, the entry control application 103 recognizes that the condition indicating the situation that operation is to be requested to the controlled object by own processing is "non-satisfaction of condition", and hence does not issues an operation request.

In the input signal judgment module 107, when the input signal from the IG key sensor 4 is "OFF", regardless of the situation that the signal has varied from "ON" to "OFF" or that the signal was "OFF" and still remains "OFF", the address of the next decision table 58 is the address in the decision table 58 corresponding to the input signals from the courtesy sensors 2 and 2. Thus, the input signal judgment module 107 reads the input signals from the courtesy sensors 2 and 2 (S2), and then determines which condition among those contained in the decision table 58 is satisfied (S3, S4). Even in this case, when any one of the input signals from the courtesy sensors 2 and 2 is "ON", since the address of the next decision table 58 is "NULL", the judgment processing is terminated and then a judgment result of "non-satisfaction of condition" is returned (S10).

When the input signals from the courtesy sensors 2 and 2 are "OFF", the address of the decision table 58 corresponding to the input signals from the door lock sensors 3 and 3 is read as the next decision table 58 from the link information 59. Thus, next, the input signal judgment module 107 reads the input signals from the door lock sensors 3 and 3 (S2), and then performs judgment processing.

When the input signals from the door lock sensors 3 and 3 satisfy whatever judgment condition, the input signal judgment module 107 acquires "NULL" as the address of the next decision table 58 (S5, S8, S11, S14). Thus, since the address is "NULL" (S6, S9, S12, S15: YES), the input signal judgment module 107 returns as a returned value the judgment result corresponding to the judgment condition satisfied by the input signals from door lock sensors 3 and 3 (S7, S10, S13, S16), and then terminates the processing. At that time, in the example of contents of the link information 59 illustrated in FIG. 6, only when the condition that the states of the input signals from the door lock sensors 3 and 3 have varied from "LOCK" to "UNLOCK" is satisfied, "satisfaction of condition" is returned as the judgment result.

That is, in the input signal judgment module 107, when judgment processing associated with entry control is performed on the basis of the link information 59 as illustrated in FIG. 6, only in a case that the input signal from the IG key sensor 4 is "OFF", that the input signals from the courtesy sensors 2 and 2 are "OFF", and that the input signals from the door lock sensors 3 and 3 have varied from "LOCK" to "UNLOCK", "satisfaction of condition" is obtained and hence entry control is executed by the entry control application 103.

As such, the link information 59 describes in a link format the sequence of reading the input signals and the relation of the next input signal determined in accordance with the judgment result of an input signal. Thus, the input signal judgment module 107 performs judgment processing when input signal judgment associated with the entry control of the room lamp 1 is merely requested from the entry control application 103.

Here, by virtue of the use of the link information 59, when the states of the input signals agree with a judgment condition in which at least one judgment concludes non-satisfaction of the entirety condition, the processing is terminated. This avoids the necessity of judgment processing on the remaining input signals, and hence has an effect of enhancing the processing speed.

Figure 9:
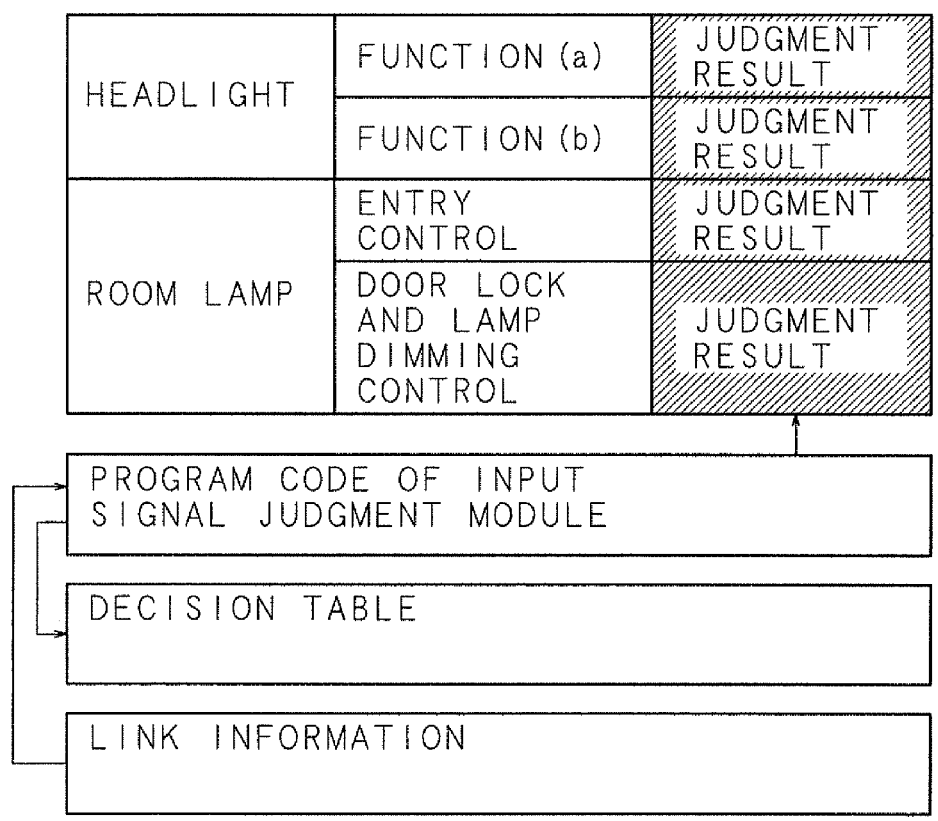
FIG. 9 is an explanation diagram conceptually illustrating a detailed example of processing that a CPU serves as an input signal judgment module.

FIG. 9 is an explanation diagram conceptually illustrating a detailed example of processing that the CPU 51 serves as the input signal judgment module 107. FIG. 9 illustrates, in the form of blocks, various kinds of information that occupies the RAM 53 when the CPU 51 serves as the input signal judgment module 107.

As illustrated in the upper part of FIG. 9, the RAM 53 stores the operation states of the actuators serving as controlled objects of the body ECU 5, like the headlights and the room lamp 1; the function under operation in each actuator; and the judgment result of the input signal corresponding to the function. Even for the same controlled object, an operation state and a judgment result are stored separately in correspondence to each function. This is because, for example, in some cases, such a situation occurs that the condition of outputting an operation request for implementing the function of entry control is satisfied but that the condition for the function of door lock and lamp dimming control is not satisfied. The contents of the operation state are stop, ON (turn-ON), OFF (turn-OFF), and the like. Here, the operation states and the judgment results shaded with inclined lines are rewritten at any time when necessary by the processing of the selecting module 105, the output driver module 106, the input signal judgment module 107, and the like.

The lower part of FIG. 9 illustrates the contents of the decision table and the link information. The decision table and the link information stored in the RAM 53 illustrated in FIG. 9 are a part of the decision tables 58, 58, . . . , and the link information 59 temporarily read from the ROM 52 by the CPU 51.

The middle part of FIG. 9 illustrates that the program code of the input signal judgment module 107 is loaded. At that time, it should be noted that the input signal judgment module 107 loaded as one program code determines whether the situation is such that an operation request for various kinds of functions is to be issued to each of the plurality of actuators. When being called by the entry control application 103 such as to perform judgment processing on the input signal, the input signal judgment module 107 reads onto the RAM 53 the link information 59 concerning entry control, then reads the decision table for each input signal, then performs judgment processing, and then writes the judgment result into the storage area corresponding to entry control. Even when being called by another application, proper operation is performed by the common code by a single piece of the input signal judgment module 107 in such a manner that the proper information stored in the storage area corresponding to each application is rewritten or the like.

As such, in both of the input signal judgment processing corresponding to the entry control application 103 and the input signal judgment processing corresponding to the door lock and lamp dimming control application 104, the input signal judgment module 107 performs the processing in common. This avoids the necessity of installing the program code of input signal judgment, separately in each application, and hence avoids the situation that a large number of program codes whose contents are mutually duplicated in large parts are loaded onto the RAM 52 so as to occupy the memory during the execution.

By the use of even a single program code, when execution is processed sequentially for each operation request from each application, a configuration that common processing is performed onto proper parameters owned by a class in such a manner that the class having one common input signal judgment module based on an object-oriented approach is realized for each function and for each input signal is achieved by an embedded computer program which has a limited memory capacity.

The capacity in the RAM 53 occupied by the program code during the execution of processing is reduced. Further, dynamic capacity allocation is unnecessary, and so is complicated memory management. Thus, this approach is suitable for processing in an ECU employing a microcomputer of simple configuration.

The storage capacity of the RAM 53 is saved. Thus, the internal configuration of the body ECU 5 is simplified. Further, a program executing judgment processing onto the input signal is not separately installed for each function to be implemented by the body ECU 5, but a commonized function of the input signal judgment module 107 is shared. Thus, as long as the interface with the input signal judgment module 107 is taken into consideration, in the development of the application programs 55, 55, . . . , development of the part other than the input signal judgment processing is sufficient. This improves the development efficiency.

In Embodiment 1, the decision tables 58, 58, . . . have been constructed as separate tables each for each input signal. Instead, the table may be constructed as one table describing a judgment condition for each input signal. In this case, the address of the next decision table 58 described in the link information 59 is replaced by the address indicating the position of the item of judgment condition for the next input signal. Even in this configuration, the method of use of the link information 59 is the same. That is, proper information concerning each function is used by a single piece of the input signal judgment module 107, so that judgment processing is executed on each input signal.

Embodiment 2

In Embodiment 1, the input signal judgment module 107 has a configuration that on the basis of the link information 59 illustrated in FIG. 6, input signals serving as judgment objects are read sequentially, and then judgment is performed according to each judgment condition described in the corresponding one of the decision tables 58, 58, . . . so that a final judgment result is obtained. In contrast, in Embodiment 2, the decision tables 58, 58, . . . store for each function: input signals serving as judgment objects; and the correspondence between mask information for the input signals to be used as components of the condition for an operation request of each function and the signal states. The link information 59 in which the sequence of reading the input signals serving as judgment objects is also referred to is not employed.

A vehicle-mounted control system according to Embodiment 2 described below has differences in the point that the link information 59 is not stored in the ROM 52, in the contents of the decision tables 58, 58, . . . , and in the details of judgment processing by the input signal judgment module 107. Apart from the point that the link information 59 is not stored, the same hardware configuration as that of the vehicle-mounted control system according to Embodiment 1 is employed. Thus, illustration and detailed description are omitted. In the following description, like modules are designated by like numerals.

FIG. 10 is an explanation diagram illustrating a basic configuration of decision tables 58, 58, . . . stored in the ROM according to Embodiment 2. The decision tables 58, 58, . . . store for each function: input signals used for determining whether the situation is such that operation corresponding to the function is to be requested to a actuator corresponding to the function; mask information used in determination of the state of each input signal; and a judgment condition for the signal state to be satisfied by the input signal. In the example illustrated in FIG. 10, when being called from the application corresponding to a particular function, the input signal judgment module 107 reads the input signal A, the input signal B, and the input signal C respectively with masking the signals on the basis of the mask information, then judges whether the judgment condition of signal state is satisfied, and then returns the judgment result.

Figure 11:
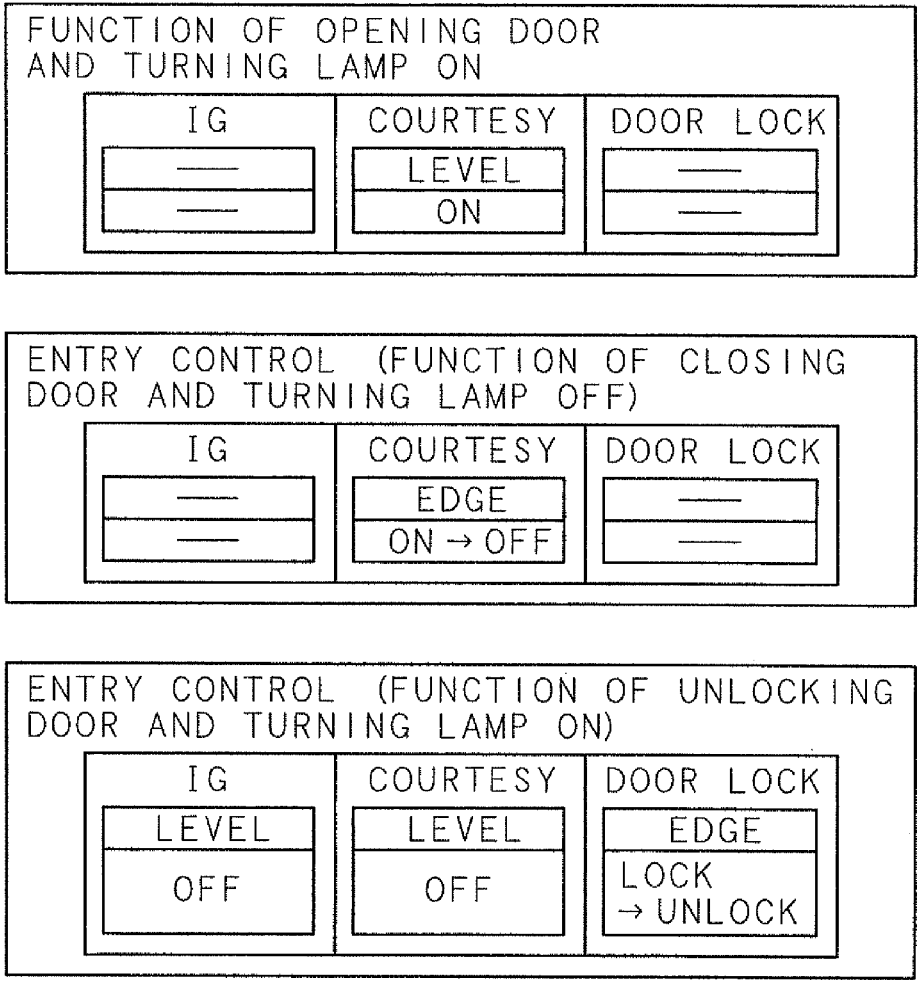
FIG. 11 is an explanation diagram illustrating an example of contents of decision tables according to Embodiment 2.

Here, in place of the for each function configuration, the decision tables 58, 58, . . . may contain decision tables each for each actuator serving as a controlled object and for each function of the actuator. FIG. 11 is an explanation diagram illustrating an example of the contents of the decision tables 58, 58, . . . according to Embodiment 2. The example illustrated in FIG. 11 contains mask information and judgment condition of signal state for each function of the room lamp 1 serving as a controlled object.

It is indicated that in the function that the room lamp 1 is turned ON as far as the door is open, turn-ON is requested to the room lamp 1 only when the condition that the input signals from the courtesy sensors 2 and 2 read in a masked state such that level judgment is to be performed are "ON" is satisfied. The mask information is "level". Thus, the above-mentioned condition is valid for both a situation that the signal state varies from "OFF" to "ON" and a situation that the signal was "ON" and still remains "ON". On the basis of the corresponding decision table 58, when the input signal judgment module 107 is called from the application of the function the room lamp 1 is turned ON as far as the door is open, it is sufficient that the input signal judgment module 107 performs solely judgment processing onto the input signals from the courtesy sensors 2 and 2. Here, the mark "-" indicates that in this judgment processing, the input signal from the IG key sensor 4 and the input signals from the door lock sensors 3 and 3 are invalid.

Another example illustrated in FIG. 11 indicates that in the function that the room lamp 1 is turned OFF when the door is closed, the turn-ON request to the room lamp 1 is stopped only when the condition that the input signals from the courtesy sensors 2 and 2 read in a masked state such that edge judgment is to be performed have varied from "ON" to "OFF" is satisfied. The mask information is "edge". Thus, the condition is satisfied only when the signal state has varied. Also in this case, it is sufficient that judgment processing onto the input signals from the courtesy sensors 2 and 2 is performed solely.

Yet another example indicates that in the function of the entry control application 103, that is, in the function that the room lamp 1 is turned ON when the door is unlocked from the outside of the vehicle by a user desiring to get in the vehicle, turn-ON is requested to the room lamp 1 only when the following input signals and the following judgment conditions on the input signals are all satisfied. That is, turn-ON is requested only when the condition that the input signal from the IG key sensor 4 read in a masked state such that level judgment is to be performed is "OFF" is satisfied, the condition that the input signals from the courtesy sensors 2 and 2 read in a masked state such that level judgment is to be performed are "OFF" is satisfied, and the condition that the input signals from the door lock sensors 3 and 3 read in a masked state such that edge judgment is to be performed have varied from "LOCK" to "UNLOCK" is satisfied.

Figure 12:
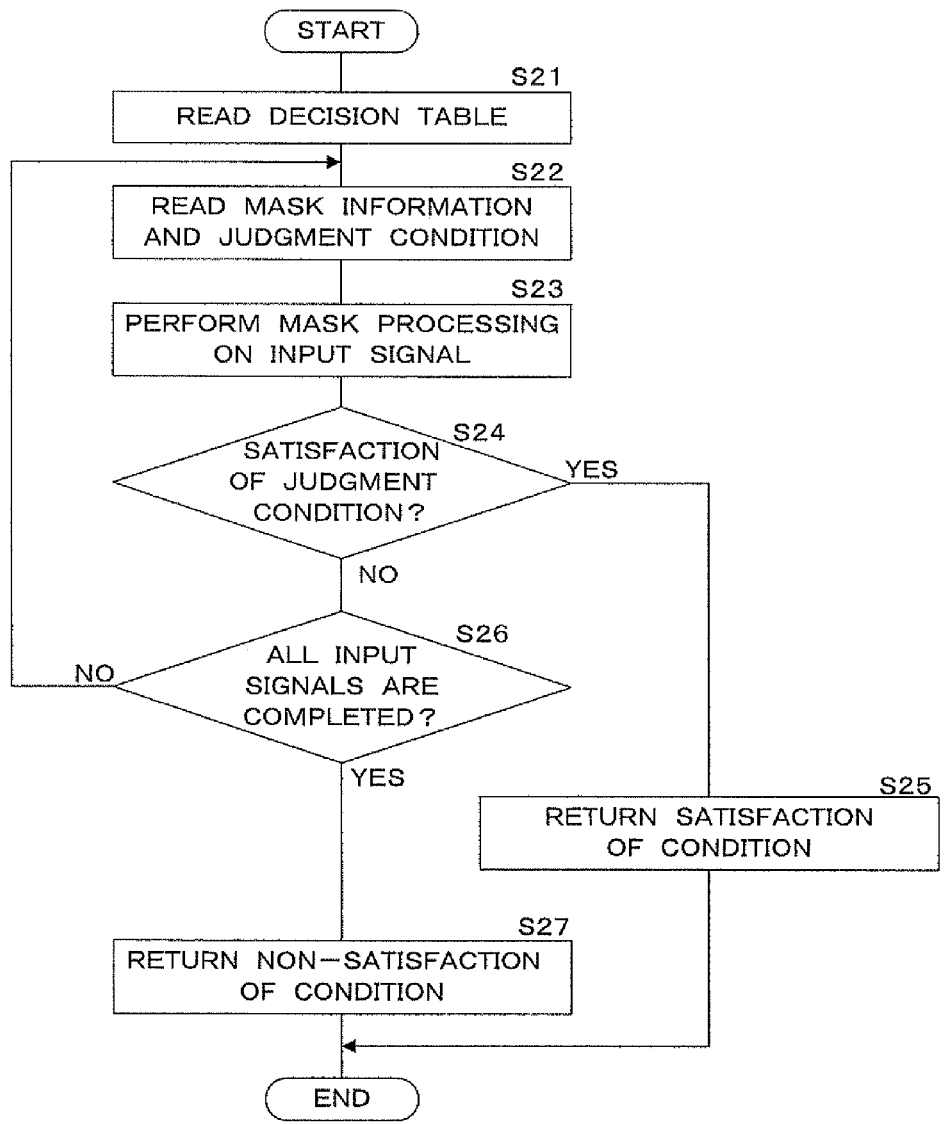
FIG. 12 is a flow chart illustrating an example of a processing procedure executed by an input signal judgment module according to Embodiment 2.

The judgment processing performed by using the decision table 58 by the input signal judgment module 107 is described below. FIG. 12 is a flow chart illustrating an example of the processing procedure executed by the input signal judgment module 107 according to Embodiment 2. The following processing is performed in order to determine whether the situation is such that the entry control application 103 is to perform the own operation of entry control. The entry control application 103 provides, to the input signal judgment module 107, information specifying the decision table 58 corresponding to the controlled object.

The input signal judgment module 107 reads the specified decision table 58 (step S21), then identifies the function having called the module itself, then reads mask information and judgment conditions from the decision table 58 corresponding to the function (step S22), and then on the basis of the read-out mask information, performs mask processing on each input signal (step S23). Specifically, signals other than the judgment objects among the plurality of input signals are masked. Further, the masking is performed such that the input signals serving as level judgment objects are level alone.

More specifically, the input signal judgment module 107 acquires information on a plurality of input signals including the input signal from the IG key sensor 4, the input signals from the courtesy sensors 2 and 2, and the input signals from the door lock sensors 3 and 3 serving as the judgment objects in entry control. Each input signal is of edge type and expressed in one byte. The lowest two bits describes a change. For example, when an input signal has varied from ON to OFF, the input signal is expressed as 0x02. When a signal has varied from OFF to ON, the signal is expressed as 0x01. A signal remaining ON is expressed as 0x03. The mask information is also expressed in one byte. Then, the case of level judgment alone is expressed as 0x01, while the case of edge judgment is expressed as 0x03. The signal state satisfying a condition is also expressed in one 1 byte. Varying from ON to OFF is expressed as 0x02, while remaining ON is expressed as 0x01. The input signal judgment module 107 calculates AND between each input signal and the mask information so as to achieve mask processing. For example, when the input signal is 0x02, the result of masking based on the mask information of level judgment is 0x00. Further, the result of masking based on the mask information of edge judgment is 0x02. Here, in the input signal judgment module 107, the information of the input signal, the mask information, and the signal state each composed of one byte may be combined into information of, for example, four bytes and then the arithmetic operation may be performed collectively. For example, when the information of the input signal is 0x03000200 and the mask information is 0x01010300, a result of 0x01000200 is obtained by mask processing. Then, it is judged whether the result agrees with a collective signal state 0x00000200 of judgment objects, as described later at step S24.

Then, the input signal judgment module 107 judges whether the signal acquired by mask processing agrees with the signal state of the judgment condition read at step S22, and thereby collectively judges the satisfaction or non-satisfaction of the judgment conditions on the plurality of input signals (step S24). When at step S24, judging that the condition is satisfied (S24: YES), the input signal judgment module 107 returns as a returned value the judgment result of satisfaction of condition (step S25), and then terminates the processing.

When at step S24, judging that the condition is not satisfied (S24: NO), the input signal judgment module 107 determines whether the judgment of satisfaction or non-satisfaction of conditions has been completed for all input signals (step S26). In the above-mentioned example, the number of input signals judged collectively is four. Thus, other signals are also to be judged, further judgment need be performed. When determining that the judgment of satisfaction or non-satisfaction of conditions has been completed for all input signals (S26: YES), the input signal judgment module 107 returns as a returned value the judgment result of non-satisfaction of condition (step S27), and then terminates the processing.

When determining that the judgment of satisfaction or non-satisfaction of conditions for all input signals has not been completed (S26: NO), the input signal judgment module 107 returns the procedure to step S22, then reads the mask information of the next judgment object and the signal state of the judgment condition so as to continue the processing.

Even in the processing by the input signal judgment module 107 where the processing procedure illustrated in FIG. 12 is executed, when the module is called from the entry control application 103, as a result of the processes illustrated in FIG. 8, it is determined whether the situation is such that turn-ON is to be is requested to the room lamp 1. In the configuration according to Embodiment 2, judgment on the signal states is performed collectively. This is the difference from the configuration according to Embodiment 1 where the input signal judgment module 107 sequentially performs judgment on the input signals serving as judgment objects.

According to Embodiment 2, when a plurality of input signals are extracted as judgment objects, judgment is performed collectively. This improves the processing speed.

Also in Embodiment 2 the input signal judgment module 107 is shared by each of a plurality of applications. This situation is similar to that of Embodiment 1. That is, in both of the input signal judgment processing corresponding to the entry control application 103 and the input signal judgment processing corresponding to the door lock and lamp dimming control application 104, the input signal judgment module 107 performs the processing in common. The only difference is the details of judgment processing. This avoids the necessity of installing the program code of input signal judgment, separately in each application, and hence avoids the situation that a large number of program codes whose contents are mutually duplicated in large parts are loaded onto the RAM 52 so as to occupy the memory during the execution. The effect of improving the development efficiency is also similar to that of Embodiment 1.

Here, it should be understood that the disclosed embodiments are completely illustrative and not restrictive. The scope of the present invention is defined by the claims rather than the description given above, and includes all modifications as long as contained in the spirit and the scope of the claims.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A vehicle control apparatus, comprising:
   a storage that stores instructions, and
   a microcomputer that is configured to:
      receive a plurality of input signals representing status information of a plurality of controlled objects or detection information from a plurality of sensors; and
      execute the instructions stored in the storage to:
         extract one or a plurality of input signals from the plurality of input signals;
         judge whether at least one of a door, a lamp, a wiper and a head light is to be controlled, based on the input signals and judgment conditions, which are used commonly for the door, the lamp, the wiper and the head light, and obtaining judgment results;
         in accordance with each of the judgment results, determine whether a situation is such that instruction to control the at least one of the door, the lamp, the wiper and the head light is to be issued, and obtaining a determination result;
         issue the instruction to control the at least one of the door, the lamp, the wiper and the head light based on the determination result, and
         select and extract branch condition information indicating input signals and judgment conditions to be provided next in accordance with the judgment results,
   wherein the storage further stores a table that describes conditions for each input signal, and
   the branch condition information contains a reference address to the judgment conditions for input signals to be provided next.

2. The control apparatus according to claim 1, wherein:
   in a case a last judgment result obtained based on input signals and judgment conditions, which are provided sequentially on the basis of the branch condition information, is satisfactory, the microcomputer determines that the situation is such that the at least one of the door, the lamp, the wiper and the head light is to be controlled.

3. The control apparatus according to claim 1, wherein the storage further stores a table that describes input signals corresponding to each instruction and judgment conditions, and
   the microcomputer extracts input signals on the basis of the table.

4. A method of controlling a vehicle, the method being performed by a microcomputer, the method comprising;
   receiving a plurality of input signals representing status information of a plurality of controlled objects or detection information from a plurality of sensors;
   extracting one or a plurality of input signals from the plurality of input signals;
   judging whether at least one of a door, a lamp, a wiper and a head light is to be controlled, based on the input signals and judgment conditions, which are used commonly for the door, the lamp, the wiper and the head light, and obtaining judgment results;
   in accordance with each of the judgment results, determining whether a situation is such that instruction to control the at least one of the door, the lamp, the wiper and the head light is to be issued, and obtaining a determination result;
   issuing the instruction to control the at least one of the door, the lamp, the wiper and the head light based on the determination result, and
   selecting and extracting branch condition information indicating input signals and judgment conditions to be provided next in accordance with the judgment results, the branch condition information containing a reference address to the judgment conditions for input signals to be provided next.

5. A non-transitory computer-readable storage medium that stores a computer-executable program to control a vehicle, the program being performed by a microcomputer, the computer-executable program comprising instructions for:
   receiving a plurality of input signals representing status information of a plurality of controlled objects or detection information from plurality of sensors;

extracting one or a plurality of input signals from the plurality of input signals;

judging whether at least one of a door, a lamp, a wiper and a head light is to be controlled, based on the input signals and judgment conditions which are used commonly for the door, the lamp, the wiper and the head light, and obtaining judgment results;

in accordance with each of the judgment results, determining whether a situation is such that instruction to control the at least one of the door, the lamp, the wiper and the head light is to be issued, and obtaining a determination result;

issuing the instruction to control the at least one of the door, the lamp, the wiper and the head light based on the determination result, and selecting and extracting branch condition information indicating input signals and judgment conditions to be provided next in accordance with the judgment results, the branch condition information containing a reference address to the judgment conditions for input signals to be provided next.

\* \* \* \* \*